United States Patent
Luo et al.

(10) Patent No.: US 9,491,816 B1
(45) Date of Patent: Nov. 8, 2016

(54) LED TUBE FOR DIRECTLY REPLACING INSTANT-START FLUORESCENT TUBE

(71) Applicants: Chongbin Luo, Foshan (CN); Guangliang Chen, Foshan (CN)

(72) Inventors: Chongbin Luo, Foshan (CN); Guangliang Chen, Foshan (CN)

(*) Notice: Subject to any disclaimer, the term of this patent is extended or adjusted under 35 U.S.C. 154(b) by 0 days.

(21) Appl. No.: 14/793,399

(22) Filed: Jul. 7, 2015

(30) Foreign Application Priority Data

Apr. 22, 2015 (CN) .......................... 2015 1 0195342
Apr. 22, 2015 (CN) ..................... 2015 2 0249140 U

(51) Int. Cl.
| | |
|---|---|
| *H05B 37/02* | (2006.01) |
| *H05B 33/08* | (2006.01) |
| *F21K 99/00* | (2016.01) |

(52) U.S. Cl.
CPC ............ *H05B 33/0812* (2013.01); *F21K 9/17* (2013.01); *H05B 33/089* (2013.01); *H05B 33/0809* (2013.01)

(58) Field of Classification Search
CPC ...... H05B 37/00; H05B 37/02; H05B 33/08; H05B 33/0809; H05B 33/0812; H05B 33/0815; H05B 33/0851
USPC ........ 315/185 R, 187, 200 R, 224–226, 291, 315/307, 312
See application file for complete search history.

(56) References Cited

U.S. PATENT DOCUMENTS 7,067,992 B2 * 6/2006 Leong ...................... F21K 9/00
315/291

* cited by examiner

*Primary Examiner* — Jimmy Vu
(74) *Attorney, Agent, or Firm* — Welsh Flaxman & Gitler, LLC

(57) ABSTRACT

The present invention discloses an LED tube for directly replacing an instant-start fluorescent tube, comprising a LED string module and a rectifying circuit used for current conversion, wherein the two input ends of the LED string module are connected with the two output ends of the rectifying circuit; the LED tube further comprises a high voltage absorption circuit, wherein the high voltage absorption circuit is used for preventing the impact on the LEDs caused by high voltage when the tube is started, and tube input ends are connected with the two input ends of the rectifying circuit through the high voltage absorption circuit. The high voltage absorption circuit is used for absorbing high voltage output when the instant-start ballast is started, so as to effectively prevent the impact on the LEDs caused by the high voltage when the tube is started. The tube can be used to directly replace an instant-start fluorescent tube without any change of the original fluorescent tube circuit.

19 Claims, 4 Drawing Sheets

LED TUBE FOR DIRECTLY REPLACING INSTANT-START FLUORESCENT TUBE

CROSS-REFERENCE TO RELATED APPLICATIONS

This application claims the benefit of priority to Chinese Patent Application No. 201520249140.2 filed Apr. 22, 2015, and to Chinese Patent Application No. 201510195342.8 filed Apr. 22, 2015, the entirety of which prior filed applications are hereby incorporated by reference.

FIELD OF THE INVENTION

The invention relates to an LED (Light Emitting Diode) tube, and particularly relates to an LED tube for directly replacing an instant-start fluorescent tube.

BACKGROUND OF THE INVENTION

The LED is extensively applied with the characteristics of energy saving and environment-friendliness. Before the LED is applied to lighting on a large scale, a fluorescent tube is extensively applied, and how to quickly replace a fluorescent tube with the LED has become the focus of attention under the background that the LED has increasingly become an attractive alternative. Since the original ballast must be removed and rewired when a fluorescent tube is replaced with an LED tube by a general user, which results in greater technical difficulty and more complicate operation, the large-scale commercial purpose of the LED tube is obviously restricted.

The tube is conducted for cold start by the high voltage (about 600V) generated by the ballast rather than preheating when the instant-start fluorescent tube (or called as a quick start fluorescent tube) is started. The general LED tube is difficult to be applied to the lamp of the ballast due to the characteristics of the instant-start ballast.

SUMMARY OF THE INVENTION

Through the thorough research and analysis on the tube and the ballast, the invention aims to provide an LED tube for directly replacing an instant-start fluorescent tube without the change of the original fluorescent tube circuit.

The technical solution provided by the present invention for solving the technical problems is as follows:

An LED tube for directly replacing instant-start fluorescent tube, comprises a LED string module consisting of a plurality of LEDs and a rectifying circuit used for current conversion, wherein the two input ends of the LED string module are connected with the two output ends of the rectifying circuit; the LED tube further comprises a high voltage absorption circuit and two tube input ends, wherein the high voltage absorption circuit is used for preventing the impact on the LEDs caused by high voltage when the tube is started, and the two tube input ends are used for receiving output of the instant-start ballast and are connected with the two input ends of the rectifying circuit through the high voltage absorption circuit.

Furthermore, the rectifying circuit is a bridge rectifying circuit consisting of high frequency diodes D1, D2, D3 and D4.

Furthermore, as the improvement of the technical solution, the high voltage absorption circuit is an LC time-delay-type high voltage absorption circuit consisting of an inductor L1, a capacitor C1 and a capacitor C2, wherein the time coefficient of the LC time-delay-type high voltage absorption circuit is 1%-5% S (1%-5% of a second), one tube input end is connected to one input end of the rectifying circuit sequentially through the inductor L1 and the capacitor C1, and the other tube input end is connected to the other input end of the rectifying circuit through the capacitor C2.

Furthermore, the LED tube further comprises an electric reactor L2 used for compensating for power offset caused by the difference of the operating voltage of the LEDs, wherein the electric reactor L2 is serially connected in a branch between the capacitor C2 and the corresponding tube input end.

Furthermore, the valve of the electric reactor L2 is selected so that the circuit presents inductive reactance.

Furthermore, the LED tube further comprises an NTC (Negative Temperature Coefficient) thermistor, wherein the NTC thermistor is serially connected in a branch between the capacitor C2 and the corresponding tube input end.

Furthermore, as the improvement of the technical solution, the high voltage absorption circuit comprises a capacitor C1, a capacitor C2 and a transformer B1 used for supplying power for the LEDs in isolation, wherein the two tube input ends are respectively connected on a primary winding through the capacitor C1 and the capacitor C2, and wherein a secondary winding of the transformer B1 is connected with the input end of the rectifying circuit.

Furthermore, the two ends of the capacitor C1 and the capacitor C2 are respectively arranged in parallel with bleeder resistors R1 and R2 used for discharging when the tubes stop working.

Furthermore, the anode and cathode ends of the LED string module are in parallel connected with a PTC (positive temperature coefficient) thermistor used for absorbing the high voltage electric power output by the instant-start ballast.

Furthermore, a PPTC (polyer positive temperature coefficient) fuse is further serially connected in a branch in which the PTC thermistor is.

The advantages of the present invention are as follows: the LED tube for directly replacing the instant-start fluorescent tube comprises the LED string module and the rectifying circuit used for current conversion, wherein the two ends of the LED string module are connected at the two ends of the rectifying circuit; the LED tube further comprises the high voltage absorption circuit used for preventing the impact on the LEDs caused by high voltage when the tube is started, and the two tube input ends are connected with the two input ends of the rectifying circuit through the high voltage absorption circuit. When the tube is started, the high voltage absorption circuit can absorb high voltage output when the instant-start ballast is started, so as to effectively prevent the impact on the LEDs caused by the high voltage when the tube is started. The tube can be used to directly replace the instant-start fluorescent tube without any change of the original fluorescent tube circuit.

BRIEF DESCRIPTION OF THE FIGURES

The LED tube provided by the invention is further described in details with reference with the accompanying drawings and the embodiments.

DETAILED DESCRIPTION OF THE INVENTION

Figure 1:
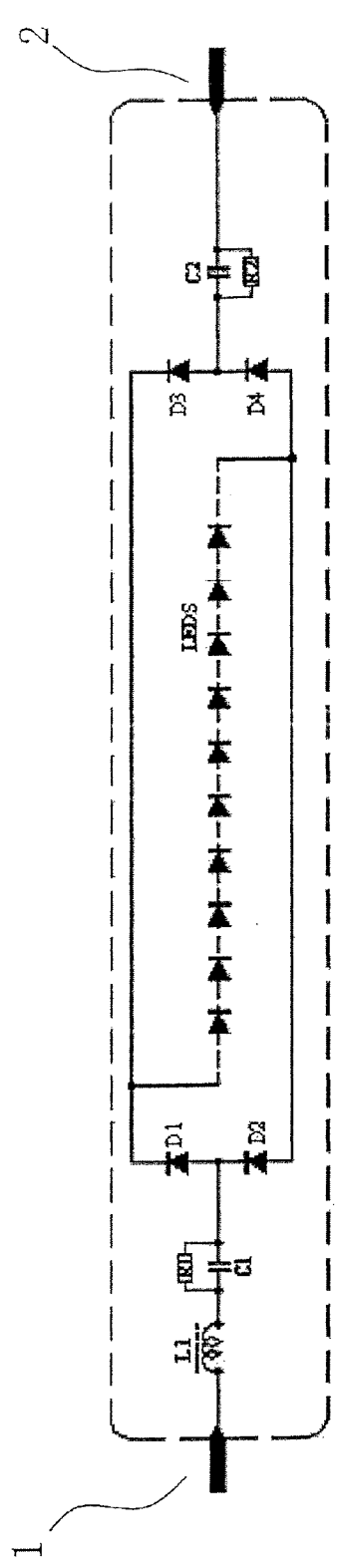
FIG. 1 is a schematic circuit diagram of the first embodiment of the invention.

Referring to FIG. 1, it shows the first embodiment of an LED tube for directly replacing an instant-start fluorescent tube provided by the invention. The LED tube completely consists of a ½ aluminum tube body, a ½ PC (Polycarbonate) transparent cover, an aluminum lamp base, an aluminum PCB (Printed Circuit Board), LEDs and other parts, wherein the tube body is made from glass, with types of T8(Ø24~26m/m) and T12(Ø34~38m/m). The lamp base may be Fa6, Fa8, G13 and the like. The length of the lamp may be one of more than 10 options between 2 feet and 8 feet. The models and specifications of interface, length and appearance of the LED tube are the same as that of an existing instant-start fluorescent tube, so that the LED tube can be directly installed in a lamp holder of an existing instant-start fluorescent tube.

The LED tube circuit comprises a LED string module LEDS consisting of a plurality of LEDs and a rectifying circuit used for current conversion, wherein the two input ends of the LED string module LEDS are connected with the two output ends of the rectifying circuit; and the LED tube circuit further comprises a high voltage absorption circuit and two tube input ends 1 and 2, wherein the high voltage absorption circuit is used for preventing the impact on the LEDs caused by high voltage when the tube is started, and the two tube input ends 1 and 2 are used for receiving output of the instant-start ballast and connected with the two input ends of the rectifying circuit through the high voltage absorption circuit.

Specifically, the rectifying circuit, which is a bridge rectifying circuit consisting of high frequency diodes D1, D2, D3 and D4, is used for rectifying a high frequency circuit output by the ballast and supplying for the tube for operation, so that the high frequency electric energy supplying for the ordinary tube for operation can be converted into current (high frequency AC/DC) supplying for the LED tube for operation.

The high voltage absorption circuit is an LC time-delay-type high voltage absorption circuit consisting of an inductor L1, a capacitor C1 and a capacitor C2, wherein the tube input end 1 at one end is connected to one input end of the rectifying circuit sequentially through the inductor L1 and the capacitor C1, and the tube input end 2 at the other end is connected to the other input end of the rectifying circuit through the capacitor C2.

When the time coefficient of the LC time-delay-type high voltage absorption circuit is set at 1-5% S (1-5% of a second), the high voltage output can be effectively absorbed when the ballast is started, and thereby the impact on the LEDs caused by high voltage can be effectively prevented when the tube is started.

The LED string module LEDS is configured as a luminous body of the tube by selecting LEDs with different magnitudes of power and different color temperatures and connecting then in serial and/or in parallel.

When the tube is started, the LC time-delay-type high voltage absorption circuit arranged at the two ends of the tube can absorb high voltage output when the instant-start ballast is started, so as to effectively prevent the impact on the LEDs caused by the high voltage when the tube is started, and the instant-start fluorescent tube can be directly replaced without the change of the original fluorescent tube circuit.

Figure 2:
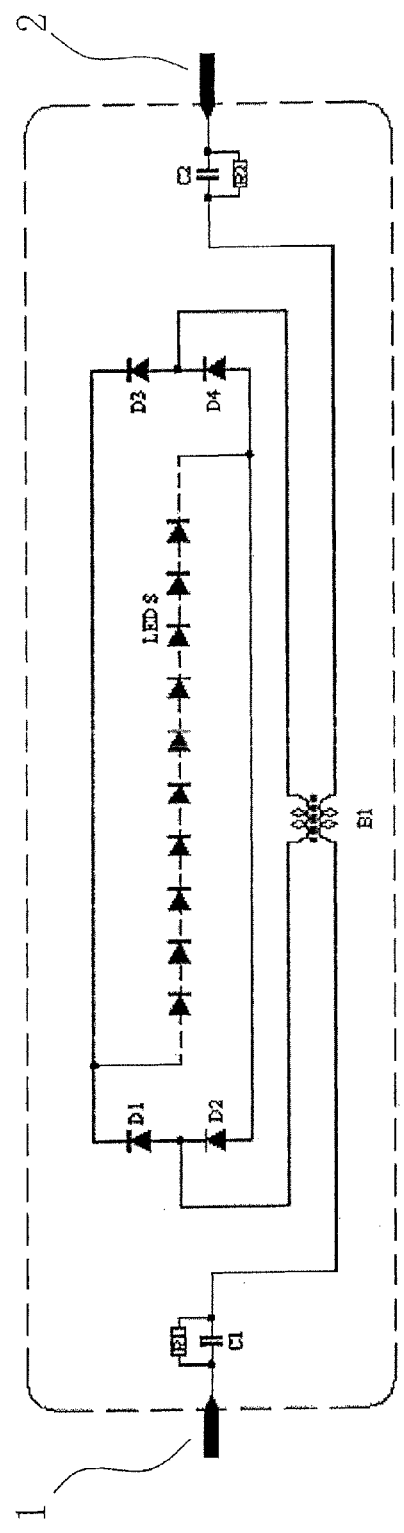
FIG. 2 is a schematic circuit diagram of the second embodiment of the invention.

In order to achieve more stable operating performance of the LED tube, a topological circuit is improved as follows. Referring to FIG. 2, the high voltage absorption circuit provided by the invention in the second embodiment comprises a capacitor C1, a capacitor C2 and a transformer B1 used for power supply of the LEDs in isolation, wherein the two tube input ends 1 and 2 are respectively connected on a primary winding of the transformer B1 through the capacitor C1 and the capacitor C2, and a secondary winding of the transformer B1 is connected with the input end of the rectifying circuit.

Different from the first embodiment, the inductor L1 is cancelled in the second embodiment, and the LEDs are powered by the transformer B1 in isolation, so that the one-pull-one ballast is extremely stable in the operating mode.

With view to the relationship between the luminance and the energy saving, the LED tube according to the invention is most optimal with energy saving of 38%, however, the requirements on load of the electronic ballast must be considered. With the substantial experiments for over a hundred times carried out on the electronic ballasts of the instant-start fluorescent tubes of major brands in the global market, a plurality of technical improvements are performed on the basis of the above two circuits to be extensively adapted to the features of the instant-start fluorescent tube of the major brands. With various improved technological factors and the extensive application thereof, the adaptability of the LED tube is more extensive and more comprehensive.

Figure 3:
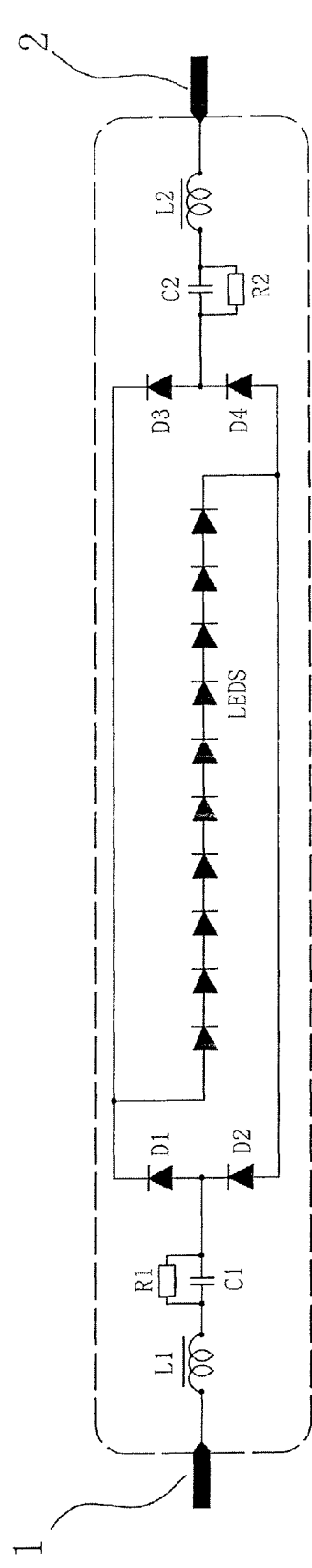
FIG. 3 is a schematic circuit diagram of the third embodiment of the invention.

Referring to FIG. 3, an inductor L2 is introduced in the third embodiment of the invention based on the first embodiment, the inductor L2 is serially connected in a branch between the capacitor C2 and the tube input end 2. Value of the inductor L2 is selected so that the circuit presents inductive reactance, and is used for compensating for power offset caused by the difference of the operating voltage of the LEDs per se.

Figure 4:
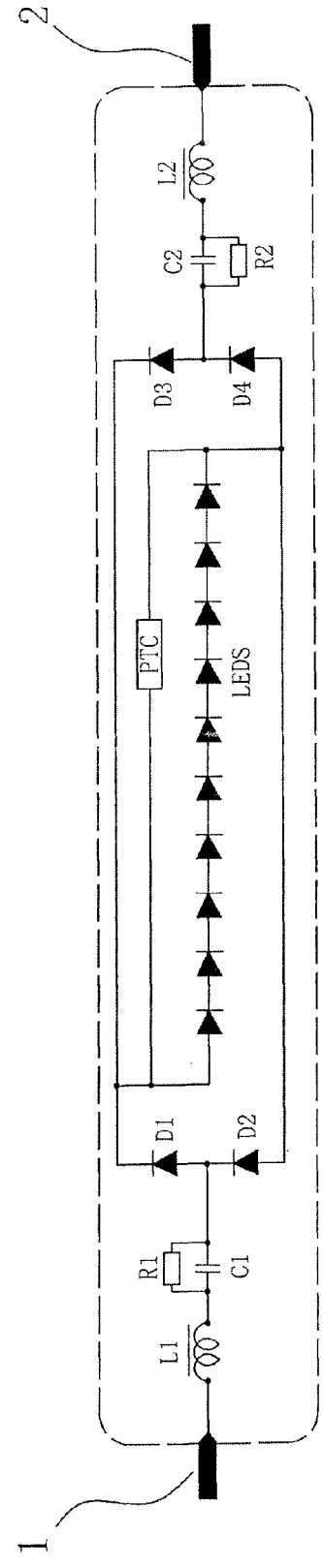
FIG. 4 is a schematic circuit diagram of the fourth embodiment of the invention.

Referring to FIG. 4, on the basis of the third embodiment, the anode and cathode ends of the LED string module LEDS are in parallel connected with a PTC thermistor used for absorbing the high voltage output by the instant-start ballast, in order to improve the safety when the LED tube is working in the fourth embodiment. The PTC thermistor is used for further absorbing the impact on the LED strings caused by the high voltage of the electronic ballast of the instant-start fluorescent tube when the tube is started. The defect is that the loss of 1 W is increased on the LED tube.

Figure 5:
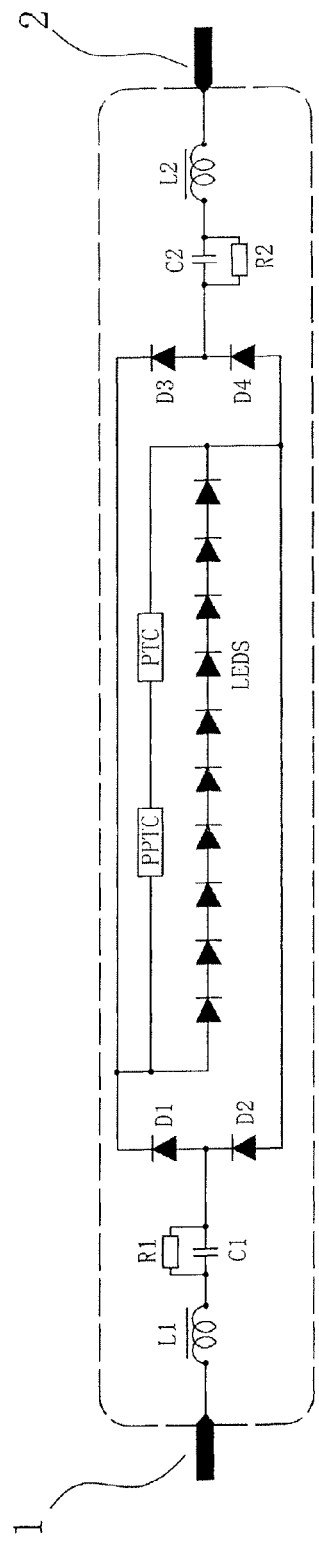
FIG. 5 is a schematic circuit diagram of the fifth embodiment of the invention.

Referring to FIG. 5, in order to reduce the loss, a PPTC is further serially connected in a branch where the PTC thermistor is in the fifth embodiment of the invention and is used for cutting off the PTC thermistor after the LED tube works for 10 s normally, so as to reduce the loss of the tube by about 0.7 W.

Figure 6:
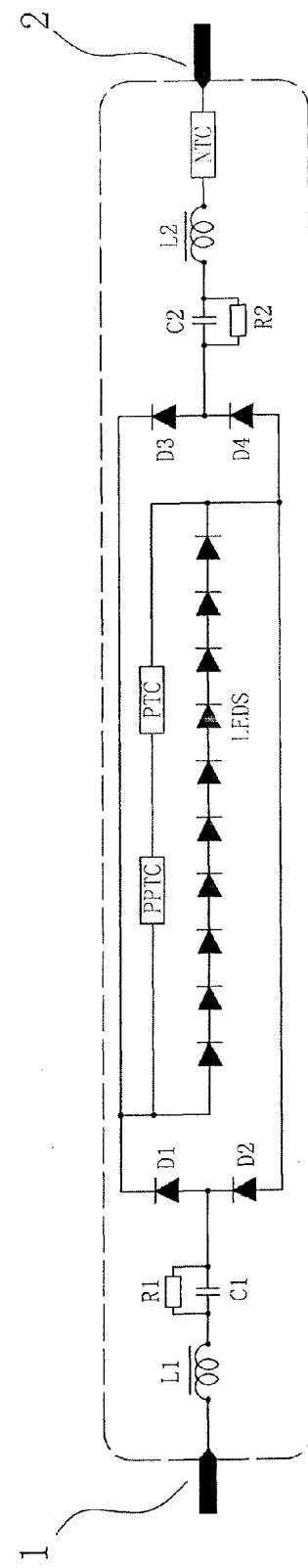
FIG. 6 is a schematic circuit diagram of the sixth embodiment of the invention.

Referring to FIG. 6, in order to apply the LED tube to a lamp with an SCR (silicon controlled rectifier) ballast for light modulating, in the sixth embodiment, the inductor L2 is replaced by an NTC thermistor on the basis of the fifth embodiment. The brightness of the LED tube does not cause a jumping phenomenon in the bright-dark-bright dimming process by using the complementation of the characteristics of the NTC thermistor that a value of resistance is high in cold and low in heat and the characteristics of an SCR light modulator.

Figure 7:
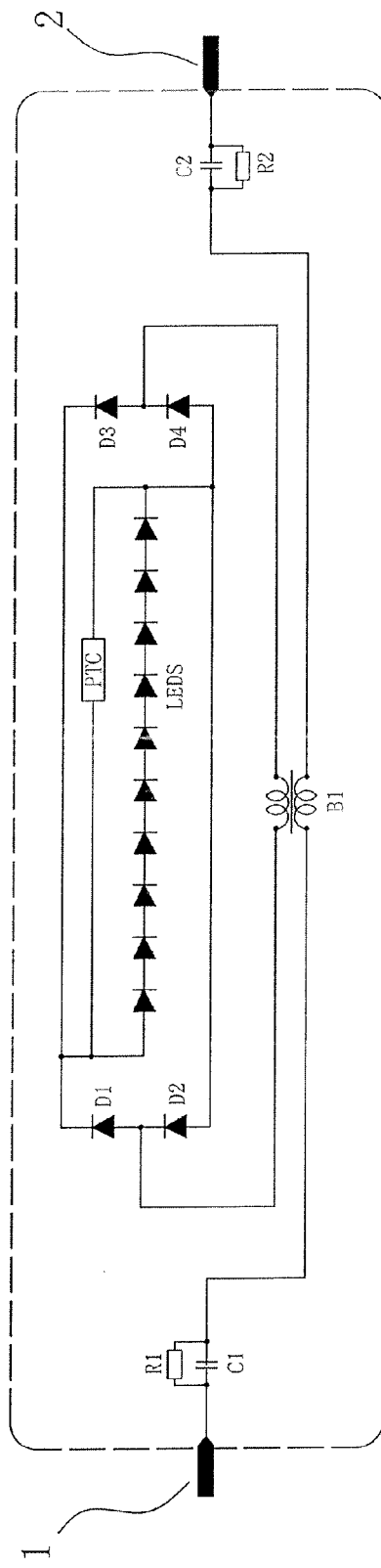
FIG. 7 is a schematic circuit diagram of the seventh embodiment of the invention.
Figure 8:
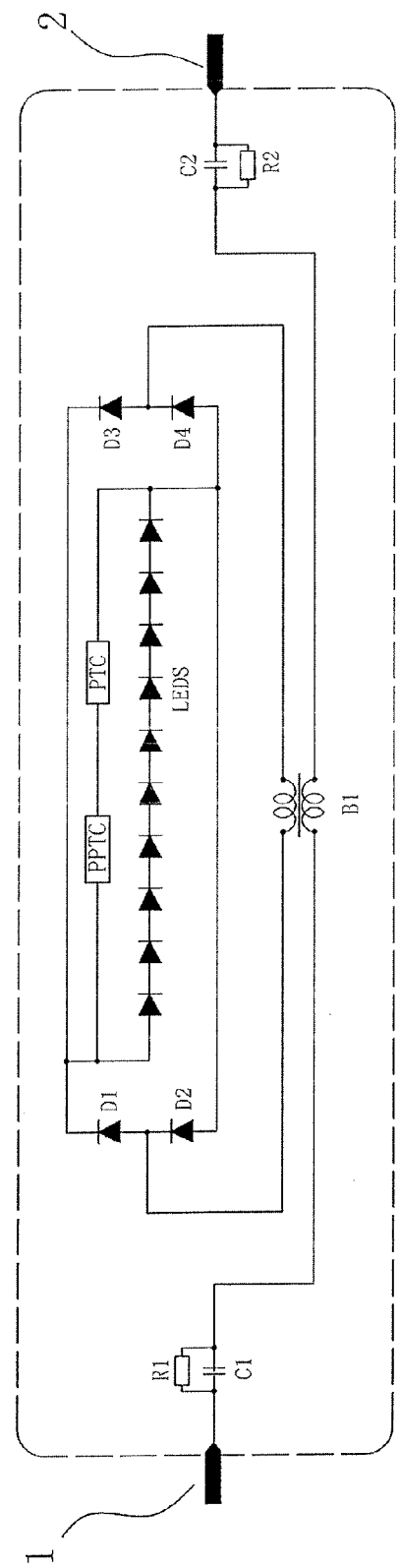
FIG. 8 is a schematic circuit diagram of the eighth embodiment of the invention.

Similarly, on the basis of the second embodiment, the anode and cathode ends of the LED string module LEDS are in parallel connected with the PTC thermistor used for absorbing high voltage output by the instant start ballast, so as to form the seventh embodiment as shown in FIG. 7. Also the PPTC is further serially connected in the branch where the PTC thermistor is on the basis of the seventh embodiment, so as to form an eighth embodiment as shown in FIG. 8.

In addition, the two ends of the capacitor C1 and the capacitor C2 are respectively provided in parallel with bleeder resistors R1 and R2 used for discharging when the tube stops working. When the tube stops working, the voltage is stored in the capacitors due to the characteristics of the capacitor C1 and the capacitor C2; when the tube is started next time, the working voltage of the tube will overlap the stored voltage of the capacitors C1 and C2, so as to cause a phenomenon that a practical working voltage is too high. By providing the bleeder resistors R1 and R2, the voltage stored in the capacitors C1 and C2 can be discharged by the resistors R1 and R2 when the tube is turned off, so as to solve the above problems.

To sum up, the above embodiments are the better embodiments of the LED tube provided by the invention. The LED tube is not limited to the above embodiment ways, any embodiment which can reach the technical effect of the invention by the same way shall belong to the protective scope of the invention.

The invention claimed is:

1. An LED tube for directly replacing instant-start fluorescent tube, characterized in that:
   the LED tube comprises a LED string module consisting of a plurality of LEDs in connection and a rectifying circuit used for current conversion, wherein the two input ends of the LED string module are connected with the two output ends of the rectifying circuit; and
   the LED tube further comprises a high voltage absorption circuit and two tube input ends, wherein the high voltage absorption circuit is used for preventing the impact on the LEDs caused by high voltage when the tube is started, and the two tube input ends are used for receiving output of the instant-start ballast and are connected with the two input ends of the rectifying circuit through the high voltage absorption circuit.

2. The LED tube for directly replacing instant-start fluorescent tube according to claim 1, characterized in that the rectifying circuit is a bridge rectifying circuit consisting of high frequency diodes D1, D2, D3 and D4.

3. The LED tube for directly replacing the instant-start fluorescent tube according to claim 1, characterized in that the high voltage absorption circuit is an LC time-delay-type high voltage absorption circuit consisting of an inductor L1, a capacitor C1 and a capacitor C2, wherein the time coefficient of the LC time-delay-type high voltage absorption circuit is 1%-5% S, one tube input end is connected to one input end of the rectifying circuit sequentially through the inductor L1 and the capacitor C1, and the other tube input end is connected to the other input end of the rectifying circuit through the capacitor C2.

4. The LED tube for directly replacing instant-start fluorescent tube according to claim 3, characterized in that the LED tube further comprises an electric reactor L2 used for compensating for power offset caused by the difference of the operating voltage of the LEDs, wherein the electric reactor L2 is serially connected in a branch between the capacitor C2 and the corresponding tube input end.

5. The LED tube for directly replacing instant-start fluorescent tube according to claim 4, characterized in that the value of the electric reactor L2 is selected so that the circuit presents inductive reactance.

6. The LED tube for directly replacing instant-start fluorescent tube according to claim 3, characterized in that the LED tube further comprises an NTC thermistor, wherein the NTC thermistor is serially connected in a branch between the capacitor C2 and the corresponding tube input end.

7. The LED tube for directly replacing instant-start fluorescent tube according to claim 1, characterized in that the high voltage absorption circuit comprises a capacitor C1, a capacitor C2 and a transformer B1 used for supplying power for the LEDs in isolation, wherein the two tube input ends are respectively connected on a primary winding through the capacitor C1 and the capacitor C2, and wherein a secondary winding of the transformer B1 is connected with the input end of the rectifying circuit.

8. The LED tube for directly replacing instant-start fluorescent tube according to claim 3, characterized in that the two ends of the capacitor C1 and the capacitor C2 are respectively arranged in parallel with bleeder resistors R1 and R2 used for discharging when the tube stops working.

9. The LED tube for directly replacing instant-start fluorescent tube according to claim 4, characterized in that the two ends of the capacitor C1 and the capacitor C2 are respectively arranged in parallel with bleeder resistors R1 and R2 used for discharging when the tube stops working.

10. The LED tube for directly replacing instant-start fluorescent tube according to claim 6, characterized in that the two ends of the capacitor C1 and the capacitor C2 are respectively arranged in parallel with bleeder resistors R1 and R2 used for discharging when the tube stops working.

11. The LED tube for directly replacing instant-start fluorescent tube according to claim 7, characterized in that the two ends of the capacitor C1 and the capacitor C2 are respectively arranged in parallel with bleeder resistors R1 and R2 used for discharging when the tube stops working.

12. The LED tube for directly replacing instant-start fluorescent tube according to claim 1, characterized in that the anode and cathode ends of the LED string module are in parallel connected with a PTC thermistor used for absorbing the high voltage output by the instant-start ballast.

13. The LED tube for directly replacing the instant-start fluorescent tube according to claim 12, characterized in that a PPTC fuse is further serially connected in a branch in which the PTC thermistor is.

14. The LED tube for directly replacing instant-start fluorescent tube according to claim 2, characterized in that the anode and cathode ends of the LED string module are in parallel connected with a PTC thermistor used for absorbing the high voltage output by the instant-start ballast.

15. The LED tube for directly replacing instant-start fluorescent tube according to claim 3, characterized in that the anode and cathode ends of the LED string module are in parallel connected with a PTC thermistor used for absorbing the high voltage output by the instant-start ballast.

16. The LED tube for directly replacing instant-start fluorescent tube according to claim 4, characterized in that the anode and cathode ends of the LED string module are in parallel connected with a PTC thermistor used for absorbing the high voltage output by the instant-start ballast.

17. The LED tube for directly replacing instant-start fluorescent tube according to claim 5, characterized in that the anode and cathode ends of the LED string module are in parallel connected with a PTC thermistor used for absorbing the high voltage output by the instant-start ballast.

18. The LED tube for directly replacing instant-start fluorescent tube according to claim 6, characterized in that the anode and cathode ends of the LED string module are in parallel connected with a PTC thermistor used for absorbing the high voltage output by the instant-start ballast.

19. The LED tube for directly replacing instant-start fluorescent tube according to claim 7, characterized in that the anode and cathode ends of the LED string module are in parallel connected with a PTC thermistor used for absorbing the high voltage output by the instant-start ballast.

* * * * *